Jan. 29, 1946. E. BRAZITIS 2,393,742
WELDING ELECTRODE HOLDER
Filed Aug. 14, 1944 2 Sheets-Sheet 2
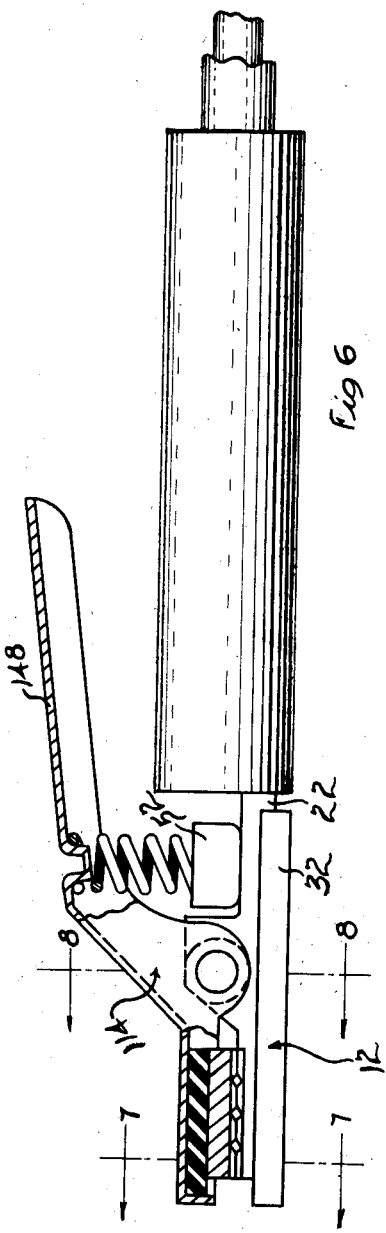
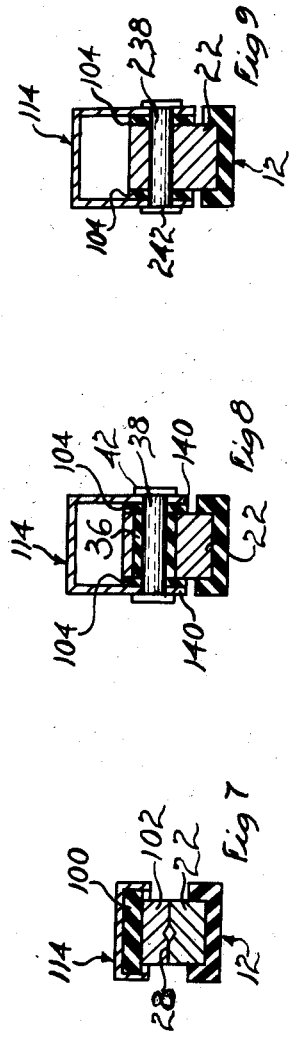
INVENTOR.
EDWARD BRAZITIS
BY
Edwin J. Walluff
Attorney Patented Jan. 29, 1946

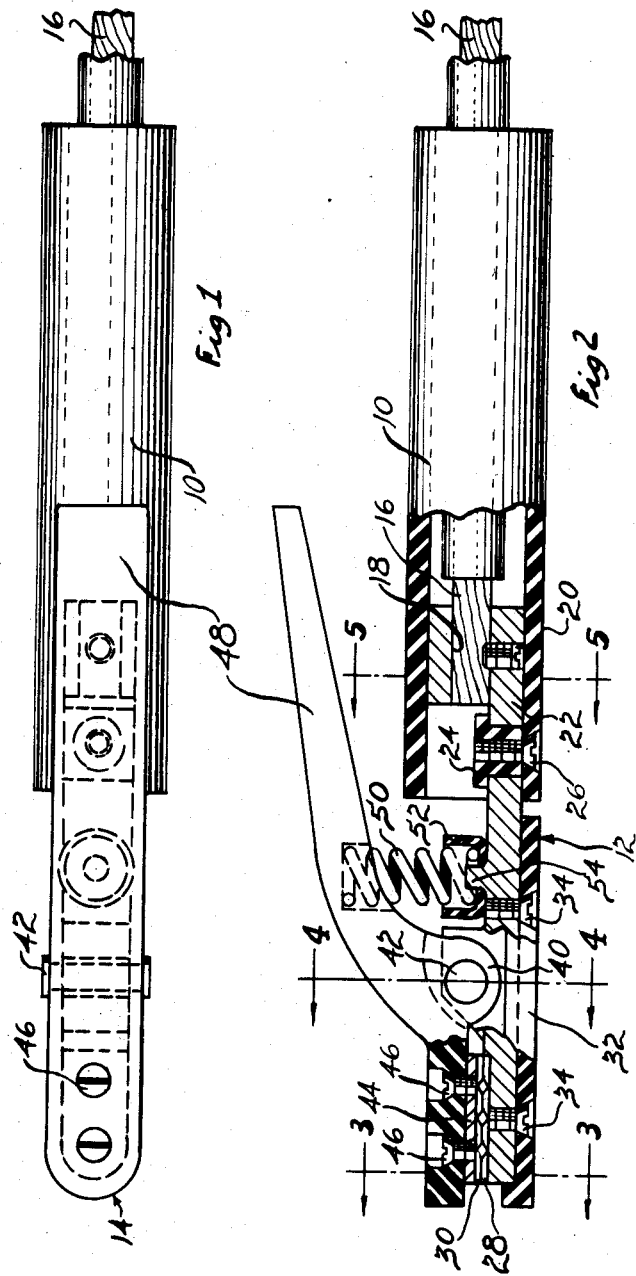

2,393,742

UNITED STATES PATENT OFFICE 2,393,742

WELDING ELECTRODE HOLDER

Edward Brazitis, St. Clair Shores, Mich.

Application August 14, 1944, Serial No. 549,335

11 Claims. (Cl. 219—8)

This invention relates to welding electrode holders and has particular reference to a new and improved construction thereof which is more durable and efficient in operation.

Principal objects of the invention are to provide:

A new and improved welding electrode holder;

A welding electrode holder of the pivoted jaw type which is constructed and arranged in such a manner that current does not flow through the pivotal connection between the jaws thereof;

A welding electrode holder which is simple in design and efficient in operation and in which certain serious defects inherent in the prior art structures have been eliminated by means of the particular construction and arrangement of the parts.

Other objects and advantages of the invention will be apparent from a consideration of the following specification taken in conjunction with the accompanying drawings, of which there are two sheets and wherein:

Fig. 1 is a plan view of a device embodying the invention;

Fig. 2 is a side elevational view, partially in section, of the holder illustrated in Fig. 1;

Figs. 3, 4 and 5 are sectional views taken along the lines 3—3, 4—4, and 5—5 respectively of Fig. 2;

Fig. 6 is a side elevational view, partially in section, of a modified form of the invention;

Figs. 7 and 8 are sectional views taken along the lines 7—7 and 8—8 respectively of Fig. 6; and Fig. 9 is a sectional view similar to Fig. 8 but illustrating a modified form of the pivotal arrangement between the two jaws of the electrode holder illustrated in Fig. 6.

Referring now to Figs. 1 to 5, there is illustrated a welding electrode holder comprising a tubular member or housing 10 having a jaw 12 fixed thereto and a pivoted jaw 14 pivoted on the jaw 12 as hereinafter explained more fully. The tubular member or housing 10 may be formed out of any suitable electrical non-conducting material and has secured in one end thereof the end of the jaw 12 to which the current conducting cable 16 is connected. The current conducting cable 16 is insulated except at the end thereof which is inserted in a socket 18 and retained therein by screw 20. The socket 18 is formed in the end of current conducting member 22 which forms a part of the jaw 12. The end of the current conducting member 22 extending into the housing 10 is provided with a hole in which a bushing of insulating material 24 is arranged, and a screw 26 of electrical insulating material or metal extending through a hole in the housing 10 and threadedly engaging the bushing 24 functions to clamp the current conducting member 22 rigidly in the end of the housing 10.

The enlarged end of the current conducting member 22 in which the socket 18 is formed may have a snug fit within the bore or hole through the housing 10 so as to make a rigid assembly. By removing the screw 26 the current conducting member 22 may be released from the housing 10 which may then be slid back along the current conducting cable 16 so that access may be had to the set screw 20 which secures such cable to the member 22. As previously indicated, the member 22 forms part of the jaw 12 which at its other end is formed to provide a working face 28 which cooperates with a similar face 30 for removably clamping an electrode therebetween.

That part of the current conducting member 22 which projects from the housing 10 may, as illustrated in Figs. 2, 3 and 4, be partially covered by a channel shaped shield or protector 32 formed of a suitable insulating material. Such shield 32 may be removably secured to the member 22 by means of screws 34 which preferably are formed of insulating material.

The member 22, as illustrated in Fig. 4 particularly, is provided with a transverse bore in which a bushing 36 of insulating material is arranged. A pivot pin 38 is journaled in such bushing 36 and projects laterally beyond the ears 40 of the jaw 14 so as to form a fulcrum therefor on the jaw 12. At its ends the pin 38 may be provided with heads 42 so as to keep the parts assembled.

The jaw 14, as illustrated in Fig. 2, is formed of a suitable electrically non-conducting material such as hard rubber or a suitable plastic. If desired it may have metal shields fixed thereto to protect it from the heat of welding. A metal jaw member 44 on which the face 30 is formed is removably secured to one end of the jaw 14 by means of screws 46 preferably formed of insulating material. The jaw 14 further includes a handle 48 which with the tubular housing 10 which forms another handle, provides a means by which the working faces 28 and 30 of the jaws may be separated for inserting an electrode between such faces or removing one therefrom, or adjusting one therein.

A coil spring 50, one end of which is seated in a socket in the handle 48 and the other end of which is seated in a cup-shaped member 52 of non-conducting material centered on a boss 54 formed on the member 22, biases jaws 12 and 14 into a closed position and the faces 28 and 30 thereof together.

From the foregoing it will be apparent that the pin 36 which forms the fulcrum or pivot for the jaws 12 and 14 does not form a path for the flow of current because of the manner in which it is insulated from the member 22, and hence such pivot is not subject to the destructive action of the current which in the devices of the prior art flows through such member resulting in breakdown of the same.

In the modification illustrated in Figs. 6, 7 and 8, the construction is largely the same as that illustrated in the previous embodiment, and so therefore I have employed the same reference characters to designate the same parts, and have described only the construction of the parts which are different. In this modification the pivoted jaw 14 may be formed out of a stamping of aluminum or other suitable material. The forward end of such jaw is channel shaped to accommodate and seat a block 100 of insulating material upon which a metal jaw member 102 is mounted, the jaw member 102 being provided with a working face like that indicated at 30 in the previous embodiment and cooperating with the working face 28 of the member 12 for clamping an electrode therebetween.

The jaw 114 includes a handle 148 and is provided with ears 140 having aligned holes therein through which pivot pin 36 extends. The pin 36 is journaled in bushing 36 which in turn is mounted in a transverse bore in the current conducting member 22. Washers 104 of electrical insulating material are arranged on the pin 36 between the member 22 and the ears 140 so as to provide an electrical break therebetween.

The working action of the parts here is the same as that in the previous modification, the principal difference being that the handle 148 is formed of a metal stamping instead of a plastic molding. However, the particular construction and arrangement of the pivotal mounting between the jaws 12 and 114 prevents the transmission of current from the current conducting member 22 to the handle 148.

In the modified embodiment of the pivotal mounting illustrated in Fig. 9, the jaw 12 has a pin 238 of electrical non-conducting material arranged therein and projecting laterally therefrom to form a fulcrum for the jaw 114. The pin 238 is provided with heads 242 which keep the parts in assembled relationship.

While the invention has been described with some detail, it is to be understood that the description is for the purpose of illustration only and is not definitive of the limits of the inventive idea. The right is reserved to make such changes in the details of construction and arrangement of parts as will fall within the purview of the attached claims.

I claim:

1. An electrode holder comprising two electrode holding jaw members, at least one of said jaw members being adapted to conduct an electrical current, means pivoting said jaw members together including a pin, parts integral with said jaw members through which said pin extends, and means comprising a member of insulating material at the pivot providing an electrical break between said pin and said one of said members.

2. An electrode holder comprising two electrode retaining jaw members, at least one of said jaw members being adapted to conduct an electrical current, means pivoting said jaw members together including a pin and parts integral with said jaw members through which said pin extends, said pivotal connection being constructed so as not to form an electrical path between said members, and a handle on which said one of said jaw members is mounted.

3. An electrode holder comprising two electrode clamping jaw members, a pivotal connection including a pin between said jaw members, at least one of said jaw members being adapted to conduct an electrical current, said pin being connected to and supporting both of said jaw members at the pivot, said pin having associated therewith at the pivot a member of electrical insulating material whereby said pin is arranged so as not to form an electrical path from either of said members.

4. An electrode holder comprising a current conducting member having a clamping jaw, a movable member pivoted thereto and having a clamping jaw cooperable with the aforesaid jaw to retain an electrode therebetween, portions of said members being constructed and arranged to engage each other at the pivot, said movable member being composed at least in part of electrical insulating material and being electrically non-conductive from either the current conducting member or the jaws of the holder.

5. An electrode holder comprising a current conducting member having a clamping jaw, a movable member pivoted thereto and having a clamping jaw cooperable with the aforesaid jaw to retain an electrode therebetween, portions of said members being constructed and arranged to engage each other at the pivot, and means for insulating said movable member from the current conducting member and the jaws of the holder.

6. An electrode holder comprising a current conducting member, a movable member pivoted thereto, portions of said members being constructed and arranged to engage each other at the pivot, said members having clamping jaws, means insulating said movable member from said current conducting member, and a channel-shaped shield of electrical insulating material covering said current conducting member.

7. In an electrode holder, a current conducting member, a movable member, said members having clamping jaws, means providing a pivotal connection between said members, portions of said members being constructed and arranged to engage each other at the pivot, said pivotal connection being constructed so that said movable member does not have an electrical connection with the current conducting member, and a channel member of electrical insulating material secured to said current conducting member.

8. In an electrode holder, a current conducting member provided with a jaw, a movable member provided with a jaw and pivoted thereto, portions of said members being constructed and arranged to engage each other at the pivot, said movable member being composed at least in part of electrical insulating material, said movable member not having an electrical path with either the current conducting member or the jaws of the holder.

9. An electrode holder comprising a member of electrical insulating material, a current conducting member, a tubular handle therefor, an exposed fastening device cooperating with said member of electrical insulating material for securing said current conducting member to said handle in such a manner that said fastening device does not conduct current from said current conducting member, said exposed fastening device consisting of a screw, the head of said screw recessed in said tubular handle, said screw having threads engaged with the internal threaded section of said member of electrical insulating material.

10. In an electrode holder, a current conducting jaw member having a pin projecting laterally therefrom and forming trunnions, a movable member, composed at least in part of electrical insulating material and having a jaw, said movable member being pivotally mounted on said trunnions, means associated with said trunnions for breaking the electrical path from the current conducting member through said movable member to said jaw thereof, and a channel member of electrical insulating material secured to said current conducting member.

11. In an electrode holder, a current conducting jaw member having a pivot pin mounted thereon, a movable member composed at least in part of electrical insulating material and having a jaw, said movable member being pivoted on said pivot pin, means associated with said pivot pin breaking the electrical path through said movable member to said jaw thereof, a shield of electrical insulating material secured to said current conducting member, and a handle on which said current conducting member is mounted.

EDWARD BRAZITIS.